United States Patent [19]
Hammerslag

[11] Patent Number: 5,549,443
[45] Date of Patent: Aug. 27, 1996

[54] BATTERY CHARGING AND TRANSFER SYSTEM

[76] Inventor: Julius G. Hammerslag, 27011 Calle Esperanza, San Juan Capistrano, Calif. 92675

[21] Appl. No.: 178,101

[22] Filed: Jan. 6, 1994

[51] Int. Cl.⁶ ............................................ B65G 67/02
[52] U.S. Cl. .................. 414/786; 320/2; 320/48; 180/68.5; 104/34; 414/390; 414/398
[58] Field of Search ...................... 414/786, 351, 414/345, 343, 340, 390, 391, 395, 396, 392, 393, 398, 399, 400, 401, 572; 104/34; 320/2, 43, 48; 180/68.5

[56] References Cited

U.S. PATENT DOCUMENTS

| | | |
|---|---|---|
| 1,764,354 | 6/1930 | Schellentrager et al. . |
| 1,858,768 | 5/1932 | Ellstrom . |
| 3,708,028 | 1/1973 | Hafer . |
| 3,838,745 | 10/1974 | Kappei . |
| 4,299,526 | 11/1981 | Smith . |
| 4,334,819 | 6/1982 | Hammerslag . |
| 4,342,533 | 8/1982 | Hane . |
| 4,450,400 | 5/1984 | Gwyen . |
| 4,983,903 | 1/1991 | Baeetal ................................. 104/34 X |

FOREIGN PATENT DOCUMENTS

| | | | |
|---|---|---|---|
| 2236215 | 5/1973 | Germany . | |
| 2410102 | 9/1975 | Germany .............................. 180/68.5 |
| 2422960 | 11/1975 | Germany . | |
| 294147 | 11/1993 | Japan .................................... 180/68.5 |
| 1438603 | 6/1976 | United Kingdom . | |
| 1575005 | 9/1980 | United Kingdom . | |

Primary Examiner—Frank E. Werner
Attorney, Agent, or Firm—Knobbe, Martens, Olson & Bear

[57] ABSTRACT

A battery transfer and charging system for electric vehicles. A displacement station removes spent batteries of electric vehicles by forcing charged batteries into position within the vehicles so as to laterally displace spent batteries. Spent batteries displaced from vehicles are received by a receiving station of the system. The receiving system includes an engagement device for engaging with engagement structures of the batteries, in order to assist the removal of spent batteries. Spent batteries removed from vehicles are tested and charged as they progress through the system in an assembly-line fashion. Following recharge, batteries are conveyed to the displacement station for installation within later vehicles. Batteries which cannot adequately be recharged are automatically removed from the system. In one embodiment of the system, vehicles drive through the system in sequential order, stopping at a specified location for battery installation/removal.

16 Claims, 4 Drawing Sheets

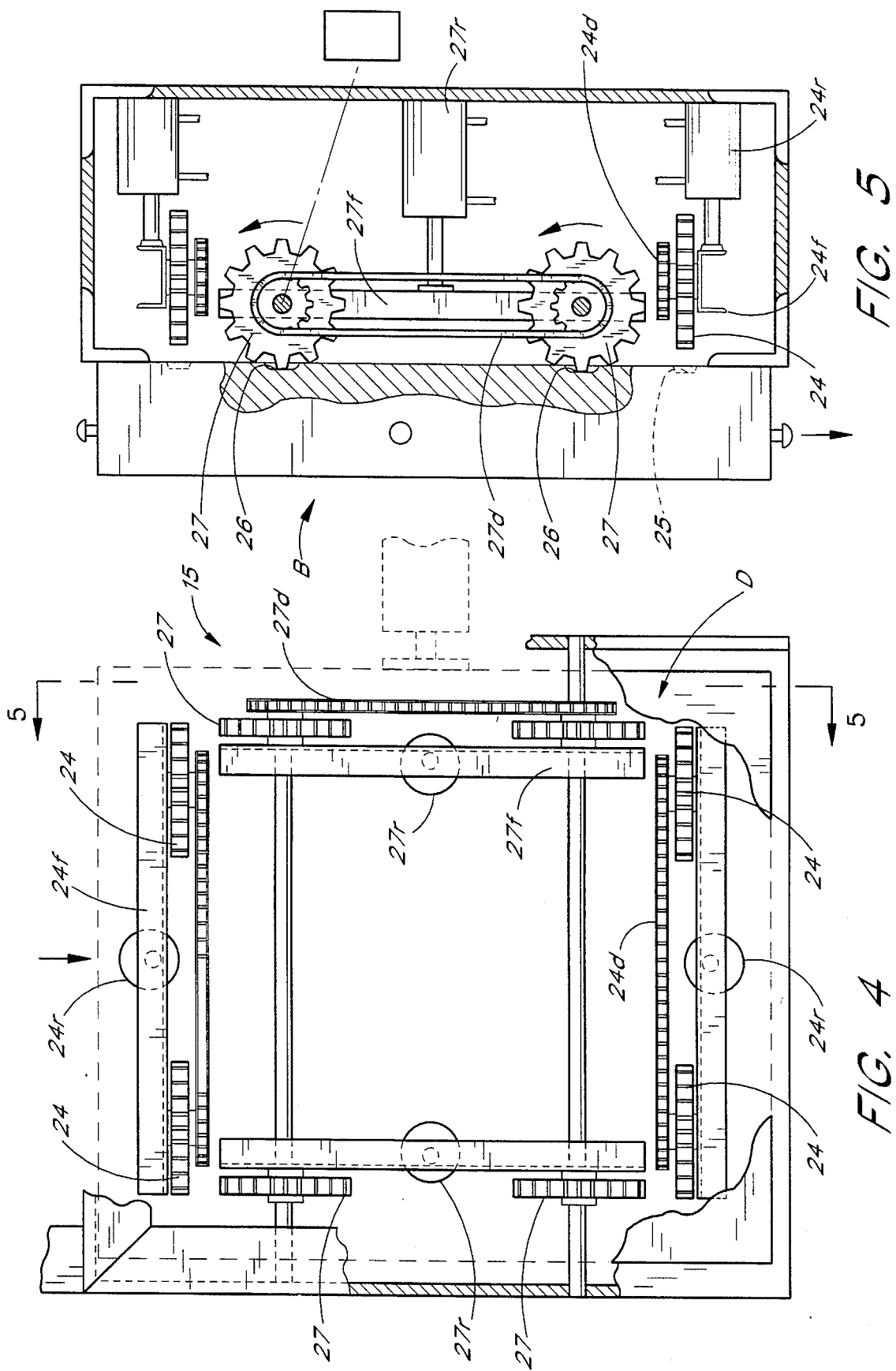

BATTERY CHARGING AND TRANSFER SYSTEM

BACKGROUND OF THE INVENTION

The present invention relates to battery charging and transfer systems. More particularly, the present invention relates to battery charging and transfer systems which enable the automated exchange and charging of electric automobile batteries.

In my prior U.S. Pat. No. 4,334,819 there is disclosed a continuous battery charging system wherein batteries are removed from an electrical vehicle at a battery transfer station. A fresh battery is installed at the transfer station, and the spent battery is placed in a charging system to be charged and returned to the transfer station.

That system contemplates the existence of a need for capability to charge a large number of exchangeable batteries, say, following adoption and acceptance by the motoring public of the concept of electric powered vehicles. One disadvantage of electric powered vehicles is the relatively short range that can be achieved using known battery technology. In order to provide a practical electric vehicle system, battery transfer capabilities must exist at numerous locations, so that the range of travel, without requiring the driver to recharge a battery, may be substantial. This is to say that if the range of an electric vehicle, without recharge of the battery or battery pack is 100 miles, then the user is limited to excursions of 50 miles. However, if at 75 or 100 mile intervals, the user can conveniently replace the partially spent battery with a fresh or fully charged battery, the limit of safe travel is extended.

Thus, my prior patent discloses an invention which enables longer range use of electric vehicles, because charged or fresh batteries can be expeditiously installed in the vehicle at locations along a course of a length greater than the round trip capability of the vehicle battery. Notwithstanding the foregoing, there remains a need for an electric battery charging and transfer system which enables the convenient removal of discharged batteries from a vehicle and replacement with a fully charged battery. The batteries and the charging system must be adapted to efficiently handle the battery during the removal, charging, and installation procedures.

SUMMARY OF THE INVENTION

To render a battery transfer and charging system of the type generically contemplated in my above-identified patent more universally applicable and commercially acceptable, the present invention provides improvements in the system in terms of the transfer method, for exchanging batteries at the transfer station, and in the mode of construction of the charging stations.

More particularly, the present invention contemplates that the electric vehicle is provided with a battery or battery pack in a relatively long and broad, but flat form, which can be laterally installed in the vehicle. The battery may be a unit of, for example, 5' wide, 5' long and 9" in height, or a composite of series connected smaller batteries in a pack or box confining the smaller batteries. In any case, the battery (unit or pack) can be readily laterally displaced from the vehicle, as by being forced from the vehicle by laterally forcing of a fresh battery into a battery seat in the vehicle. In the battery seat, contact of the battery terminals with the drive motor for the vehicle is automatically established.

With such a system, vehicles can be sold with an initial battery which can be exchanged for a fresh battery at a transfer station for a relatively small cost, amounting to the re-charging cost of the battery, plus depreciation and exchange, by a battery charging organization having stations located strategically in areas to service a growing population of compatible electric vehicles.

To facilitate growth of a system of battery transfer stations, the stations according to the present invention are modular in construction. This enables a transfer station to be erected with low initial investment cost. The station can be enlarged as demand increases.

In accomplishing the foregoing, I have provided for a battery transfer station, into which a standardized vehicle can be driven. The vehicle contemplated by the invention has a battery seat means for containing a relatively broad, flat battery. A charged battery can be shifted laterally into position within the battery seat means. As the charged battery is shifted into position, the charged battery comes into contact with the existing battery and laterally forces the existing battery out of the battery seat means to a receiving means. Sprockets of the receiving means engage with notches on the bottom surface of the existing battery as the existing battery is displaced from the battery seat means. The sprockets complete the removal of the existing battery from the vehicle.

Drive means are provided to shift a fresh battery horizontally into the battery seat, and means are provided to receive the spent battery in the charging system. The spent battery is tested, rejected if unfit for recharge, or recharged in sequence with other batteries, while being transported through charging locations to the transfer station, for installation in a later vehicle.

The charging and transfer systems of the invention are incorporated in a modular construction, whereby, initially, a small charging station may be established, and as demand grows, second and additional or modules may be added, based on the initial station and utilizing much of the same transfer and handling apparatus.

This invention has other advantages and features which will best be understood by reference to the example disclosed herein, but it is to be understood that the following detailed description and the accompanying drawings are not to be taken in a limiting sense. The invention is defined in the appended claims.

BRIEF DESCRIPTION

FIG. 4 is an enlarged, fragmentary top plan view, on the line 4—4 of FIG. 3, with parts broken away, showing the battery installation means;

FIG. 5 is a vertical sectional view on the line 5—5 of FIG. 4, with parts broken away;

FIG. 7 is a transverse, fragmentary sectional view on the line 7—7 of FIG. 2.

DESCRIPTION OF THE PREFERRED EMBODIMENT

Figure 1:
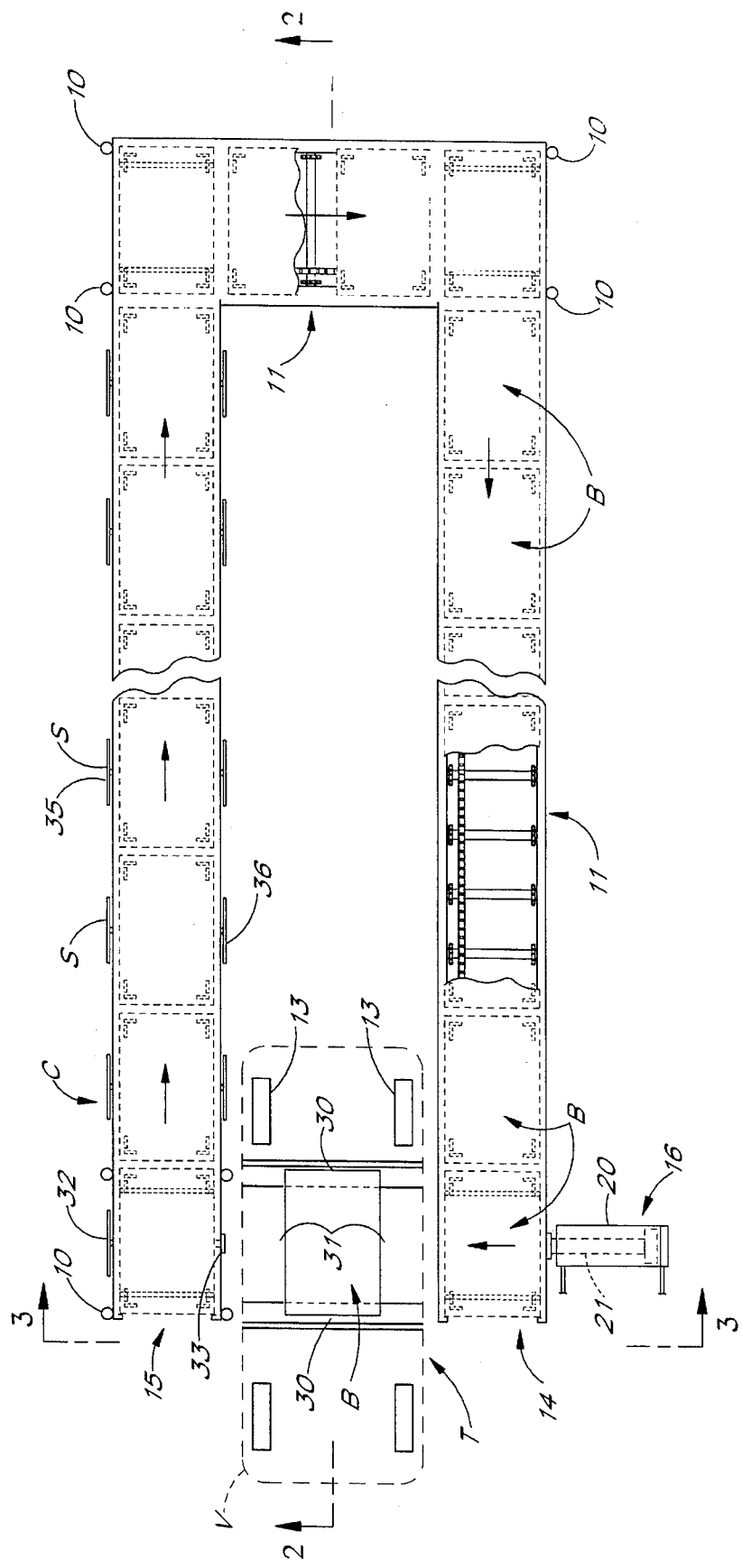
FIG. 1 is a top plan view, with parts broken away, showing a battery transfer and charging system in accordance with the present invention.
Figure 2:
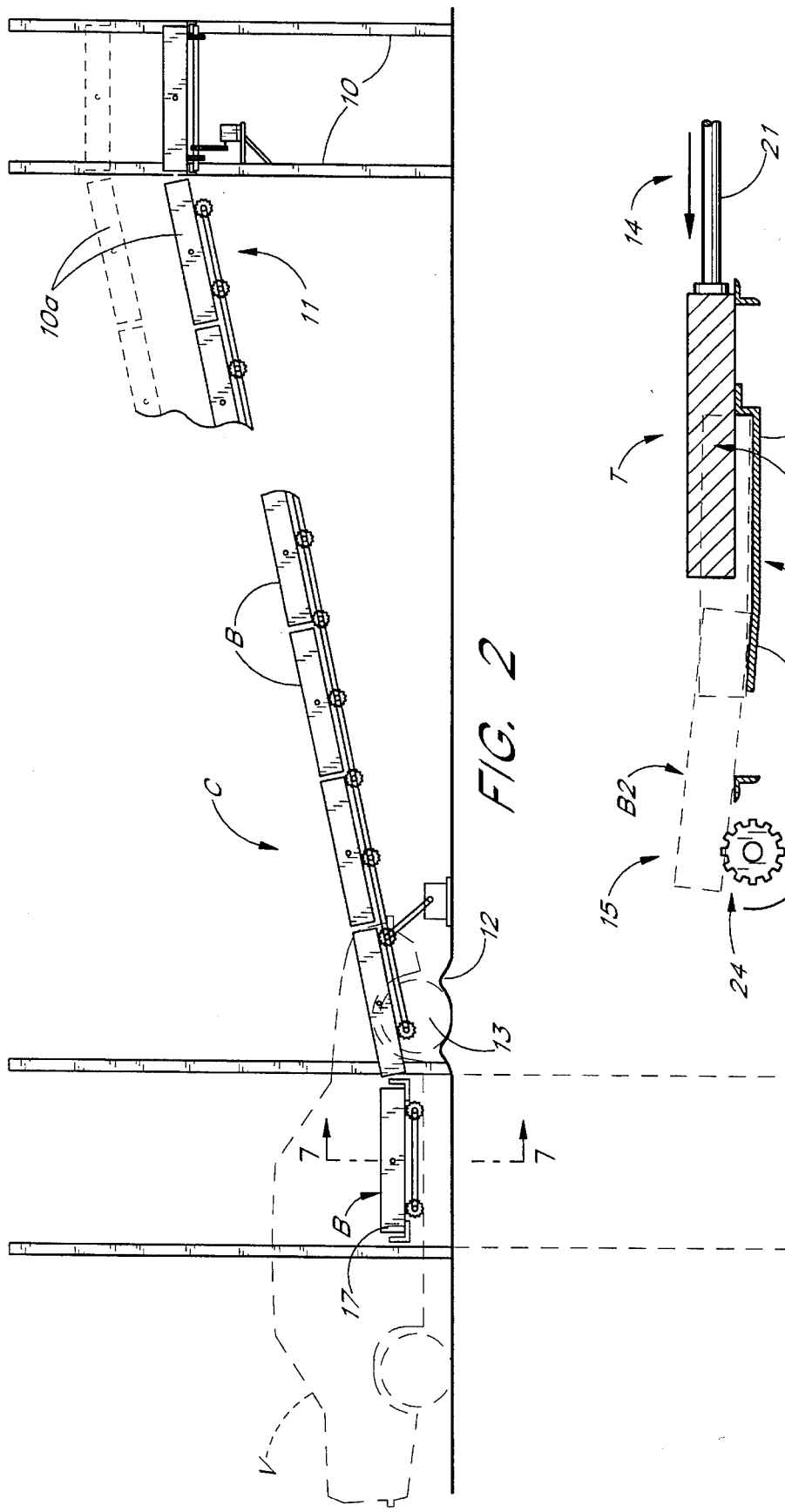
FIG. 2 is a vertical sectional view on the line 2—2 of FIG. 1, showing a first module in full lines, and showing additional modules in broken lines.

Referring first to FIGS. 1 and 2, there is generally illustrated a preferred embodiment of the invention, wherein batteries B are exchanged at a battery transfer station T. Spent batteries are displaced from a vehicle V into a charging system C and transported through a path past a plurality of charging stations or locations S, returning to the transfer stations for subsequent installation into vehicles.

The structure is shown as including a number of vertical support posts 10, on which a frame structure 11 is mounted in a suitable fashion. The posts 10 extend vertically for a desired distance to enable the application thereto of a series of vertically spaced battery transport frame modules, as indicated at 10a in FIG. 2, each of which will correspond, in general, with the transport and charging system described below.

Referring to FIG. 2, the transfer station T includes a positioning structure 12, shown as a receptacle for the front wheels 13 of the vehicle V, as the vehicle is driven into the transfer station T, whereby vehicles of standard length will be uniformly longitudinally positioned in the transfer station. If desired, plural positioning means 12 may be provided at the spaced locations for vehicles of different lengths. In any event, the vehicle is properly positioned between a battery displacement station 14 and a battery receiving station 15, provided by the battery charging system, whereby a fresh battery is horizontally moved by a shifting means 16 from the displacement station 14 into the battery compartment 17 (FIG. 2) of the vehicle V. The incoming battery displaces an existing vehicle battery from the compartment 17 to a sufficient degree to permit a receiving means of receiving station 15 to complete the removal of the existing battery.

The actual battery exchange in the vehicle can be accomplished in any of a variety of alternative ways, depending upon the configuration of the battery and the vehicle's battery receiving structures. For example, instead of forcible displacement of the installed discharged battery with a new charged battery, the installed discharged battery can be previously removed such as by a sprocket as will be discussed infra. In addition, although the preferred embodiment utilizes a lateral, horizontal installation and removal of the battery, variations will become apparent to one of ordinary skill in the art in view of the disclosure herein and the desired battery compartment configuration for the vehicle.

For example, the battery can readily be adapted for vertical removal from the automobile followed by vertical installation of the new battery. Similarly, the battery can readily be horizontally removed along an axial direction such as from the rear of the car or from the front of the car. The precise location and mode of removal of the battery is a design consideration that can be optimized through routine experimentation by one of ordinary skill in the art, in view of such considerations as battery size, weight distribution in the vehicle, and other access considerations such as the location of doors, wheels and the like.

Although a single battery is preferred, two, three, four or more discrete batteries can also be removed or installed into a single vehicle. The use of multiple batteries contained in separate units may be desirable from an engineering or esthetic design standpoint, depending upon the automobile configuration and the total volume of battery desired. In addition, a principal running battery and a separate "reserve" battery may be desirable from a consumer convenience standpoint.

Adaptation of the various vertical lifts, conveyors and other structural components of the battery charging and transfer system of the present invention to accommodate each of these types of variations will be readily achievable by one of ordinary skill in the art in view of the disclosure herein.

The illustrated charging station structure extends longitudinally from the receiving station 15, thence transversely and in a return run to the displacement (installation) station. Thus, lateral space to accommodate the vehicle between longitudinal runs is provided. The transverse section of the charging system, as seen in FIG. 2, is elevated, and the parallel longitudinal runs are upwardly inclined from the transfer station so that the vehicle, following battery exchange, can drive beneath the elevated, transverse section of the structure, between the vertical support posts 10. Alternatively, the transverse section of the battery pathway can readily be positioned beneath the path of the exiting car, if desired, or the car can be required to back out of the exchange stall if it is desired to maintain the battery conveyor system substantially along a single horizontal plane. In the prior two configurations, Vehicles can drive through the entire structure in a sequential fashion.

As seen in FIG. 1, a hydraulic ram 20 has a rod 21 adapted to be extended to forcefully displace the battery or battery pack B into the vehicle. Referring to FIG. 7, the rod 21 laterally forces the battery B1 into a battery seat 22 in the vehicle. The battery B1 displaces the existing vehicle battery B2, forcing the existing battery B2 onto an exit conveyor such as up an inclined ramp section 23 of the seat 22 towards the battery receiving station 15.

The battery seat in the vehicle is structured to provide retention means to prevent lateral movement of the battery from the seat, except at the transfer station where suitable displacement means 16, such as the ram 20 is provided. Any of a variety of retention structures can be provided, depending upon the battery design and battery seat design. For example, one or more vertically extending ridges or projections can be provided at the installation side and/or the exit side of the battery to provide a stop over which the battery must travel to exit the car. The stop can be permanently positioned, or movable between a "locked" and "unlocked" position. Alternatively, any of a variety of battery compartment hatches can be used, which will normally be locked shut except during the battery exchange process.

In the illustrated embodiment, the battery seat 22 is provided with a shoulder on the installation side of the seat, to prevent movement of the battery in the reverse direction. Although the present inventor prefers a system in which the batteries are introduced and removed in a continuous single direction path of travel, the conveyors and hydraulics of the transfer station can readily be modified by one of skill in the art to accomplish battery removal and installation from the same side of the vehicle if desired.

Drive means D, seen in FIG. 4, are provided to assist the lateral movement of the spent battery from the vehicle. Such drive means D may include, as partially shown by FIG. 7, driven sprocket means 24 adapted to engage in notches or recesses 25 (FIG. 6) on the bottom surface of the battery, to complete the transfer of the battery B2 from the vehicle into the receiving station 15. The notches 25 are located preferably adjacent to the opposite ends of the battery B, and provide sprocket abutments enabling lateral drive of the battery. The underside of the battery also has laterally spaced sprocket receiving recesses 26, providing abutments engagable by additional drive sprockets 27 (FIGS. 4 and 5)

adapted to engage and shift the batteries progressively through the charging stations in a lateral direction perpendicular to the direction of displacement.

Alternatively, any of a variety of engagement structures can be provided on the battery pack, to enable engagement with the drive mechanism of the transfer station. The use of a particular structure, such as hooks, rings, projections or recesses will depend upon the load of the battery to be transferred, the static friction or structural stop to be overcome in removing the battery, and the direction of removal, such as horizontal plane or vertical lift as will be readily apparent to one of skill in the art. In general, the engagement structures are preferably relatively low profile to minimize the opportunity for inadvertent interlocking with other batteries or parts of the system, and yet permit transfer of sufficient force to manipulate the battery through the transfer station. For this purpose, the present inventor prefers a plurality of spaced recesses on the battery housing, to be engaged by a sprocket as illustrated, or other engagement structure on the drive mechanism.

Figure 3:
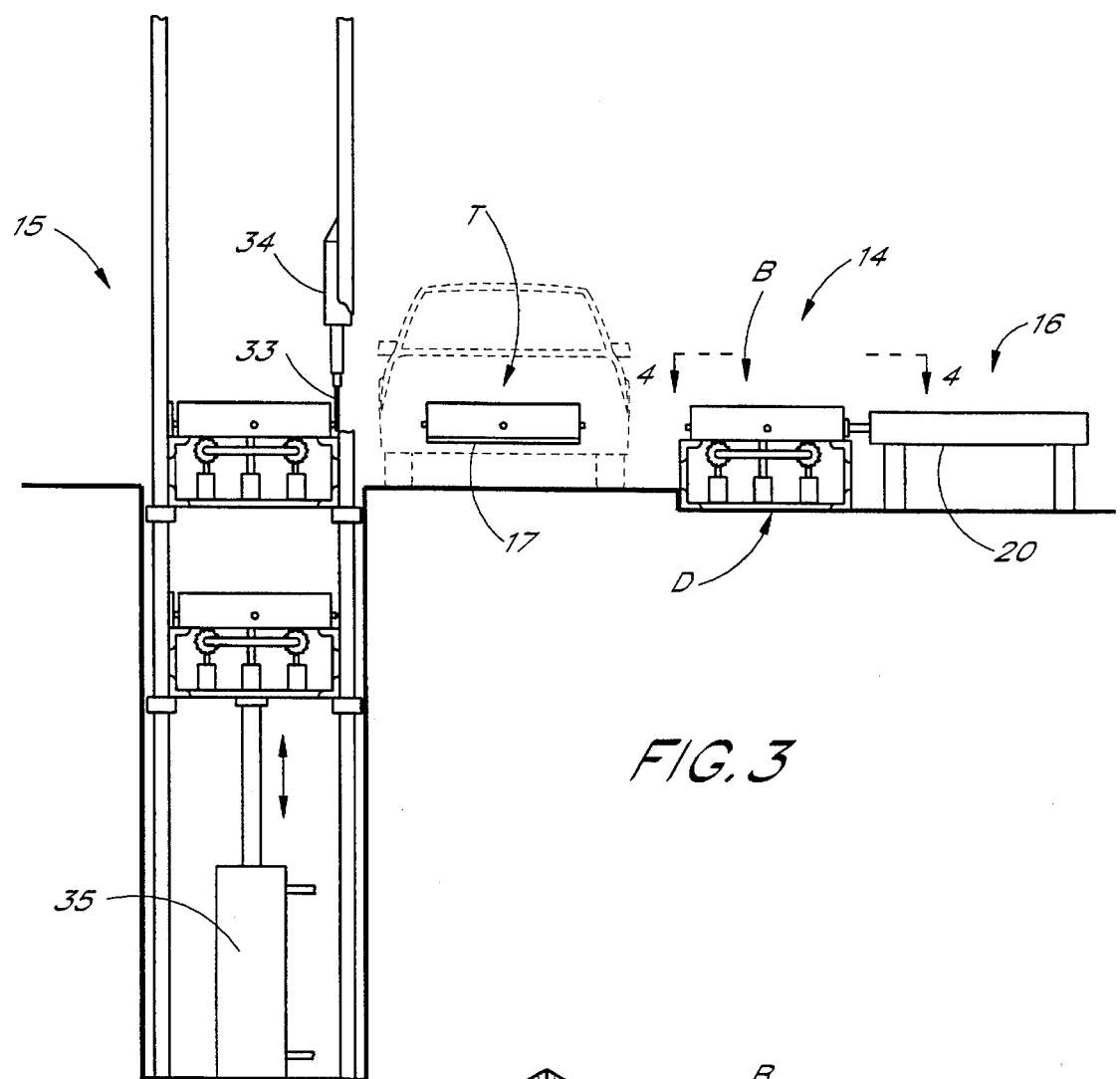
FIG. 3 is a transverse sectional view on the line 3—3 of FIG. 1.
Figure 6:
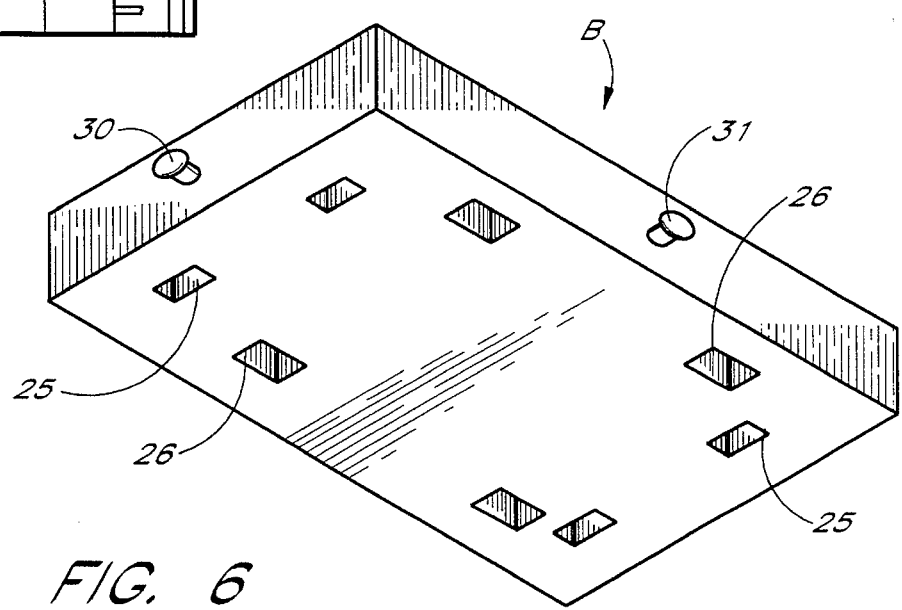
FIG. 6 is a predominantly bottom perspective view of an exemplary battery or battery box for use with the invention.

As illustrated by FIGS. 1 and 6, the battery has contact posts 30 at its opposite ends which are automatically engaged with contacts within the vehicle, when the battery is shifted into the vehicle. Also, on opposite sides of the battery are charging contacts 31, which are also used as test contacts. Thus, when the battery is displaced from the vehicle at the transfer station, the displaced battery enters the receiving station, and the contact 31 on one side engages a test rail 32. A vertically shiftable test contact 33 is adapted to be elevated and lowered by a ram 34 at the receiving station 15, whereby the battery can be tested. At the test station the battery can be lowered to a defective battery location for removal from the system by means of a ram 35 (FIG. 3) below the receiving station.

As batteries are progressively moved past the charging stations S, the posts or contacts 31 engage charging contacts 35 and 36. The charging posts 35 and 36 are controlled by a voltage regulator (not shown) so that the charge level of the batteries is controlled. The particular configuration of the electrical contacts can be varied widely as will be apparent to one of ordinary skill in the art. For example, in place of the illustrated post 31, any of a variety of electrically conductive contact surfaces either above or below the adjacent surface of the battery can be provided. Alternatively, any of a variety of plugs, clips, conductive cables and the like can be utilized to reversibly place both the car and the charging station in electrical contact with the battery.

The transverse drive notches 25 in the batteries also enable lateral battery movement, as the batteries reach the end of the first longitudinal run from the receiving station, so that the batteries can be shifted to the longitudinal run returning to the receiving station 14.

Referring to FIGS. 4 and 5, since the transverse drive sprockets 24 and the longitudinal drive sprockets 27 cannot be simultaneously engaged with batteries, the sprockets 24 and drive means 24d are mounted on a frame structure 24f which is selectively vertically shifted by a ram 24r. Likewise a ram 27r vertically shifts the sprocket frame structure 27f and sprocket drive 27d. Thus, the sprockets 24 and 27 are selectively engagable with the battery drive recesses 25 and 26.

From the foregoing, it will be understood that the present invention provides an improved system utilizing the principles of my above-identified pending application, whereby batteries or battery packs can be easily and expeditiously transferred to and from an electric vehicle by a storage and charging system which can be developed progressively as the need for added modules arises. Each module will be substantially the same as the first and can be installed or constructed in vertical tiers.

The elevator assemblies at the transfer station may be structured to enable the raising and lowering of batteries to and from a tier of selected height, so that a large number of batteries can be stored and charged in a compact space.

Although this invention has been described in terms of certain preferred embodiments, other embodiments that are apparent to those of ordinary skill in the art in view of the disclosure herein are also within the scope of this invention. Accordingly, the scope of the invention is intended to be limited only by reference to the appended claims.

What is claimed:

1. A method of replacing an electric battery in an electrically powered passenger vehicle, comprising the steps of:

providing a battery transfer station having at least one drive-through bay for receiving an electric passenger vehicle therein, said transfer station having a battery conveyor loop which extends from a first side of the vehicle to a second side of the vehicle when the vehicle is positioned within the bay, a portion of the conveyor loop being elevated or lowered relative to a vehicle level to allow passenger vehicles to pass below or above the conveyor loop, said conveyor loop including an exchange station for conveying a discharged battery out of the vehicle and for conveying a charged battery into the vehicle, said conveyor loop having at least one charging station;

positioning the electric passenger vehicle within the bay, the vehicle having a discharged battery therein, said step of positioning comprising driving the vehicle into an entrance end of the bay;

conveying the discharged battery from a compartment of the vehicle along the conveyor loop to the charging station, the compartment extending through the vehicle from said first side to said second side such that the compartment and said conveyor loop form a closed-loop transfer path when the vehicle is positioned within the bay;

conveying a charged battery along the conveyor loop into the compartment; and removing the vehicle from the bay in the transfer station, said step of removing comprising driving the vehicle from an exit end of the bay.

2. A method as in claim 1, wherein said step of conveying the discharged battery from the compartment comprises engaging the discharged battery with the conveyor loop and conveying the discharged battery out of the compartment.

3. A method as in claim 1, wherein said step of conveying the discharged battery from the compartment comprises displacing the discharged battery with the charged battery.

4. A method as in claim 3, wherein said displacing step comprises conveying a charged battery into the compartment from a first side thereof until said charged battery contacts the discharged battery, and advancing the charged battery to forcibly move the discharged battery out of the compartment.

5. A method as in claim 1, wherein said step of conveying a charged battery into the compartment comprises automatically establishing electrical connection of the charged battery to a circuit of the vehicle.

6. A method as in claim 1, further comprising the step of automatically charging the discharged battery at the charging station.

7. A method as in claim 1, further comprising the step of automatically testing the discharged battery at a testing station on the conveyor loop.

8. A method as in claim 1, further comprising the step of adding a capacity enlarging module to the conveyor loop to thereby increase the battery capacity of the conveyor loop.

9. A method of establishing a continuous, battery transfer loop and replacing a battery in a vehicle, comprising the steps of:

providing a vehicle having a first battery, said first battery positioned in a compartment having a battery installation opening on a first side of the vehicle and a battery exit opening on a second side of the vehicle;

engaging the vehicle with a battery transfer station, said battery transfer station including a battery conveyor which extends between said first and second sides of the vehicle when the vehicle is engaged with the battery transfer station, thereby establishing a continuous battery transfer loop between the battery exit opening on the vehicle and the battery installation opening on the vehicle;

advancing a second battery along said continuous battery transfer loop, through said battery installation opening on the first side of the vehicle and into said compartment;

advancing said first battery from said compartment through said battery exit opening and along said continuous battery transfer loop; and disengaging the vehicle from the battery transfer station, with said second battery in said compartment and said first battery in said battery transfer station;

wherein said step of engaging and/or said step of disengaging comprises driving said vehicle above or below a portion of said conveyor.

10. A method as in claim 9, wherein said advancing said first battery step includes the step of pushing said first battery through said battery exit opening with said second battery.

11. A method as in claim 9, further comprising the step of advancing said first battery along said continuous battery transfer loop to a battery charging station, and charging said first battery.

12. A method for the high speed, continuous, efficient replacement of discharged batteries in passenger vehicles with charged batteries, comprising the steps of:

providing a battery transfer station, having
a drive through vehicle bay having an entrance on a first end thereof and an exit on a second end thereof to permit the vehicle to enter the bay, stop within the bay, and exit from the bay along a predetermined path without reversing direction;
a continuous battery transfer conveyor, having a battery receiving end at a first side of the bay and a battery delivery end at a second side of the bay;
at least one battery charging station on the battery transfer conveyor between the battery receiving end and the battery delivery end; and
a vertically displaced section of the conveyor, for permitting the conveyor to cross the predetermined path and to place the battery receiving end in communication with the battery delivery end by way of the conveyor without preventing the vehicle from advancing along the predetermined path;

advancing a vehicle along the predetermined path and into the bay, said vehicle having a discharged battery in a battery compartment therein, said battery compartment having a battery exit opening on one side of the vehicle, and a battery installation opening on another side of the vehicle;

establishing a continuous, closed battery transfer loop from the battery compartment, out the battery exit opening on the vehicle and onto the battery receiving end of the conveyor, along the conveyor to the delivery end, from the conveyor delivery end through the battery installation opening on the vehicle and into the battery compartment;

conveying the discharged battery from the battery compartment of the vehicle out through the battery exit opening and onto the battery receiving end of the conveyor; and conveying a charged battery along the conveyor, off of the conveyor delivery end, through the battery installation opening and into the battery compartment in the vehicle.

13. A method as in claim 12, further comprising the step of advancing the discharged battery along the conveyor and into a battery charging station thereon.

14. A method as in claim 13, further comprising the step of advancing a battery from the battery charging station along the conveyor and into the battery compartment in the vehicle.

15. A method as in claim 14, wherein the conveyor comprises a battery testing station thereon for testing batteries advanced along the conveyor, the method further comprising the steps of:

advancing the discharged battery along the conveyor and into the battery testing station;

testing the battery in the battery testing station to assess suitability to receive a charge; and based upon the results of the test, either advancing the battery along the conveyor to the charging station, or removing the battery from the conveyor.

16. A method as in claim 12, wherein said step of conveying the discharged battery from the battery compartment comprises displacing the discharged battery with the charged battery.

* * * * *